United States Patent [19]
Hansen

[11] Patent Number: 6,158,756
[45] Date of Patent: Dec. 12, 2000

[54] MAXIMUM CLEARANCE HIGH STRENGTH VEHICLE LOWER BODY PROTECTOR THAT REPOSITIONS TO A VEHICLE ENTRY OR EXIT STEP

[76] Inventor: David Curtis Hansen, 2942 Sunset Ridge, McKinney, Tex. 75070

[21] Appl. No.: 09/348,365

[22] Filed: Jul. 7, 1999

Related U.S. Application Data

[60] Provisional application No. 60/091,877, Jul. 7, 1998.

[51] Int. Cl.[7] .................................................. B60R 3/02
[52] U.S. Cl. ........................................ 280/166; 296/146.9
[58] Field of Search ................................. 280/164.1, 166, 280/163; 296/62, 146.9; 182/91, 127

[56] References Cited

U.S. PATENT DOCUMENTS

| | | | |
|---|---|---|---|
| D. 292,904 | 11/1987 | Bielby | D12/203 |
| 3,758,134 | 9/1973 | Stewart | 280/163 |
| 4,530,519 | 7/1985 | Marshall | 280/770 |
| 4,935,638 | 6/1990 | Straka | 280/164.1 |
| 4,943,085 | 7/1990 | Straka | 280/777 |
| 5,358,268 | 10/1994 | Hawkins | 280/166 |
| 5,697,626 | 12/1997 | McDaniel et al. | 280/166 |
| 5,713,589 | 2/1998 | Delgado et al. | 280/163 |

*Primary Examiner*—Richard M. Camby

[57] ABSTRACT

A protective barrier (10) for mounting in close proximity to those vehicular surfaces being protected, and made integral with a step supporting surface (27) that will reposition to assist entry or exit from the vehicle, and then return to its protective position through operation of a motive means (22, 24, 30 and 32).

The mounting (14a and 14b) of the device is non-intrusive to any portion of the vehicle in such a way that eases its installation, operation and maintenance, supports any vehicle warranty, and does not require special tools or processes for installation, operation or maintenance.

1 Claim, 4 Drawing Sheets

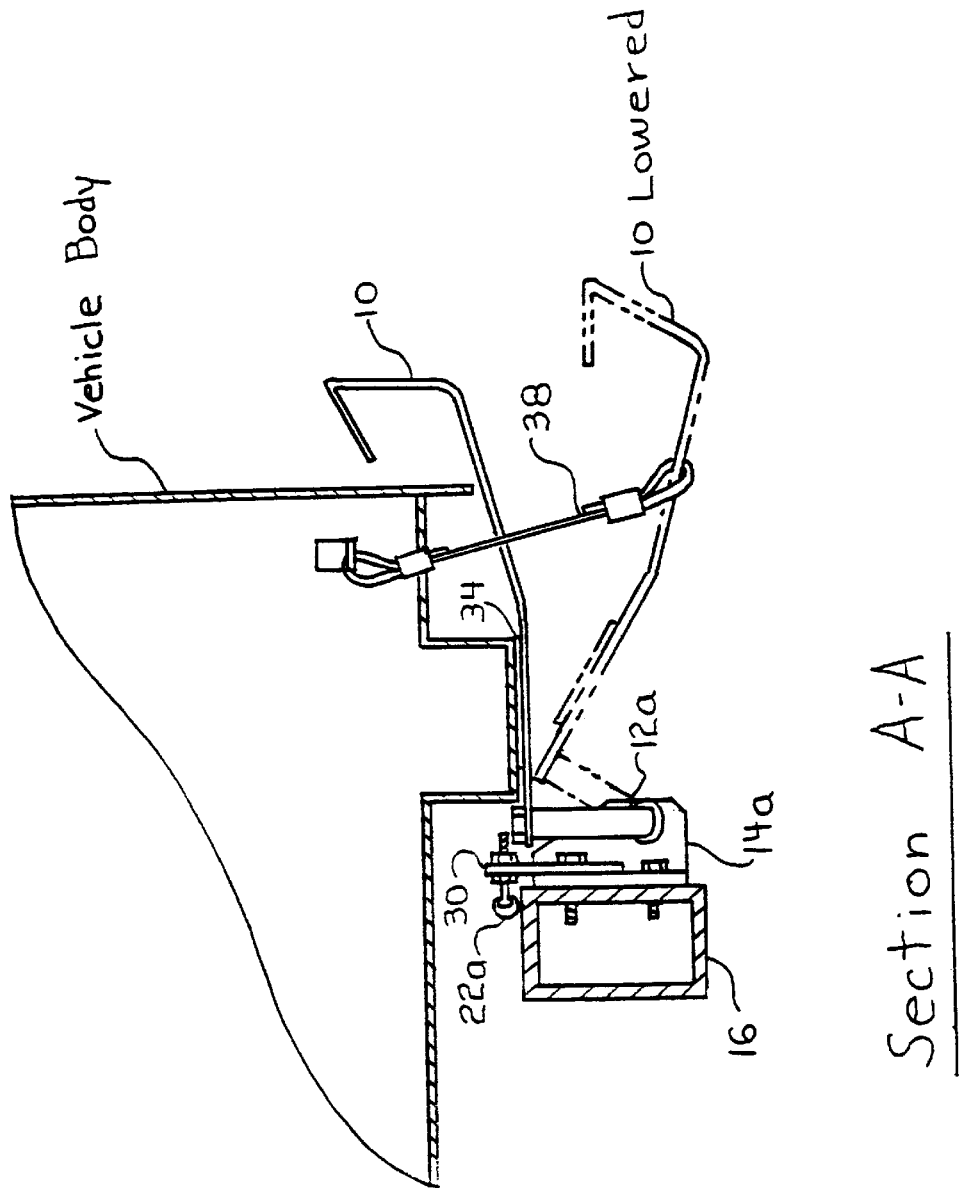

MAXIMUM CLEARANCE HIGH STRENGTH VEHICLE LOWER BODY PROTECTOR THAT REPOSITIONS TO A VEHICLE ENTRY OR EXIT STEP

BACKGROUND—CROSS REFERENCE TO RELATED APPLICATIONS

This application claims the benefit of Provisional Patent Application Ser. N0. 60/091877 filed Jul. 7, 1998.

BACKGROUND—FIELD OF INVENTION

This invention relates to improvements in the field of protective devices for underside and lower outer surfaces of vehicles as well as entry/exit steps for vehicles and finally a combination of the features important to both of these prior mentioned fields within a single device.

BACKGROUND—DESCRIPTION OF PRIOR ART

Prior art has described methods and designs for vehicle entry/exit steps, some more complicated in design and operation than others. However, these designs do not provide for vehicle protection.

The designs described in prior art as regards vehicle entry/exit surfaces (steps) are either designed to avoid contact with other objects, or are otherwise not sturdy enough to withstand an impact equal to the weight of the vehicle. Such an impact would cause substantial damage to the step, perhaps to the point as to make the step inoperable and/or beyond repair.

Other prior art presents various designs for protective devices for vehicles. However, no mention is made in this group of prior art of an entry/exit surface being an integral part of the design.

The designs described in prior art as regards vehicle protective devices do not serve to act as an entry/exit surface, especially such a surface as one that repositions to act as an entry/exit surface and repositions again to act as a protective barrier.

In particular, there is no known prior art regarding a single device serving the dual purposes of providing vehicle protection and a repositionable entry/exit surface.

OBJECTS AND ADVANTAGES

Several objects and advantages of my invention present a single device through which multiple desirable results are achieved. Specifically, a single protective barrier is shaped accordingly to each vehicle such that vehicular surfaces otherwise vulnerable to damage through contact with other objects (i.e.—for a sport utility vehicle or off-road use vehicle commonly referred to as a jeep, such an object may be a rock, slump or the earth's surface in general) are now shielded from that damaging contact.

The contact can be to the underside of the vehicle from underneath in the near vertical direction, or on the lower portion of the outer side of the vehicle in the near horizontal direction or to generally these areas of the vehicle from any angular direction between horizontal and vertical.

This same shaped protective barrier includes as part of its geometry a shape suitable for securely supporting a person's foot or feet who is entering into or exiting from the vehicle. A notable object and advantage of my design is that the mounting arrangement between my invention and the vehicle provides for the holding and positioning of the protective barrier in very close proximity to the protected surfaces while also providing for repositioning of the step support surface to a lowered position when used as a supporting entry/exit surface.

In its lowered position the step support surface is much closer to that area external to the vehicle onto which the person is either moving to or away from. For example, the step-up distance from the ground into the vehicle when entering a vehicle that has my invention installed is much less than the same step-up distance on a vehicle that has installed any of the inventions described in prior art for vehicle entry/exit devices.

Additionally, my invention affords a complete protective environment undescribed in prior art for other protective devices in that my invention is shaped and formed to cover:

- in the fore-aft axis relative to the vehicle, from the forward-most point of the lower outer body edge (beginning just behind the front wheel well) and extending generally horizontally rearward to the aft-most point of the same edge (just forward of the rear wheel well)
- in the athwartship axis relative to the vehicle, from just outboard of the lower outer body edge, then running athwartship generally horizontally, towards the middle of the vehicle to the intersecting primary frame member
- in the vertical axis relative to the vehicle, from the lower outer body edge running generally vertically to a point a short distance alongside the generally vertical body surface of the vehicle.

My invention is self-repositioning to its protective position from its entry/exit position through a means of an operationally simple, non-intrusive motive means. In its preferred embodiment this operationally simple, non-intrusive motive means is applied by the use of generally available hardware components (a pressurized gas spring, ball joints, rod-end joints, nuts and bolts) and simple geometric shaped plates. Other embodiments include an electric motor connected to appropriately designed linkage, hydraulically powered pumps and appropriately designed linkage, along with switches and/or sensors that sense and activate said motive power, such as a vehicle door sensor invoked so as to operate said device.

Further, my invention is shaped and formed so as to afford a visually continuous design line connecting the forward and rear wheel wells of a vehicle onto which it is mounted, resulting in a positive aesthetic addition to the vehicle.

My invention is designed to mount directly to the main chassis frame member without significant intervention by the owner. This design ensures that drilling and welding operations are eliminated and avoids any question that the vehicle has been detrimentally modified from its original state, ensuring that any warranty offered from the vehicle manufacturer will be unaffected by my invention and the installation and operation thereof.

My invention is scalable to be sized in all directions to provide protection and step surfaces for any such vehicle as it may be mounted on. Thus, large wheelbase, multi-door vehicles as well as short wheelbase, 2 door vehicles, may benefit from its features.

Further objects and advantages of my invention will become apparent from a consideration of the drawings and ensuing description.

LIST OF REFERENCE NUMBERS

Figure 1:
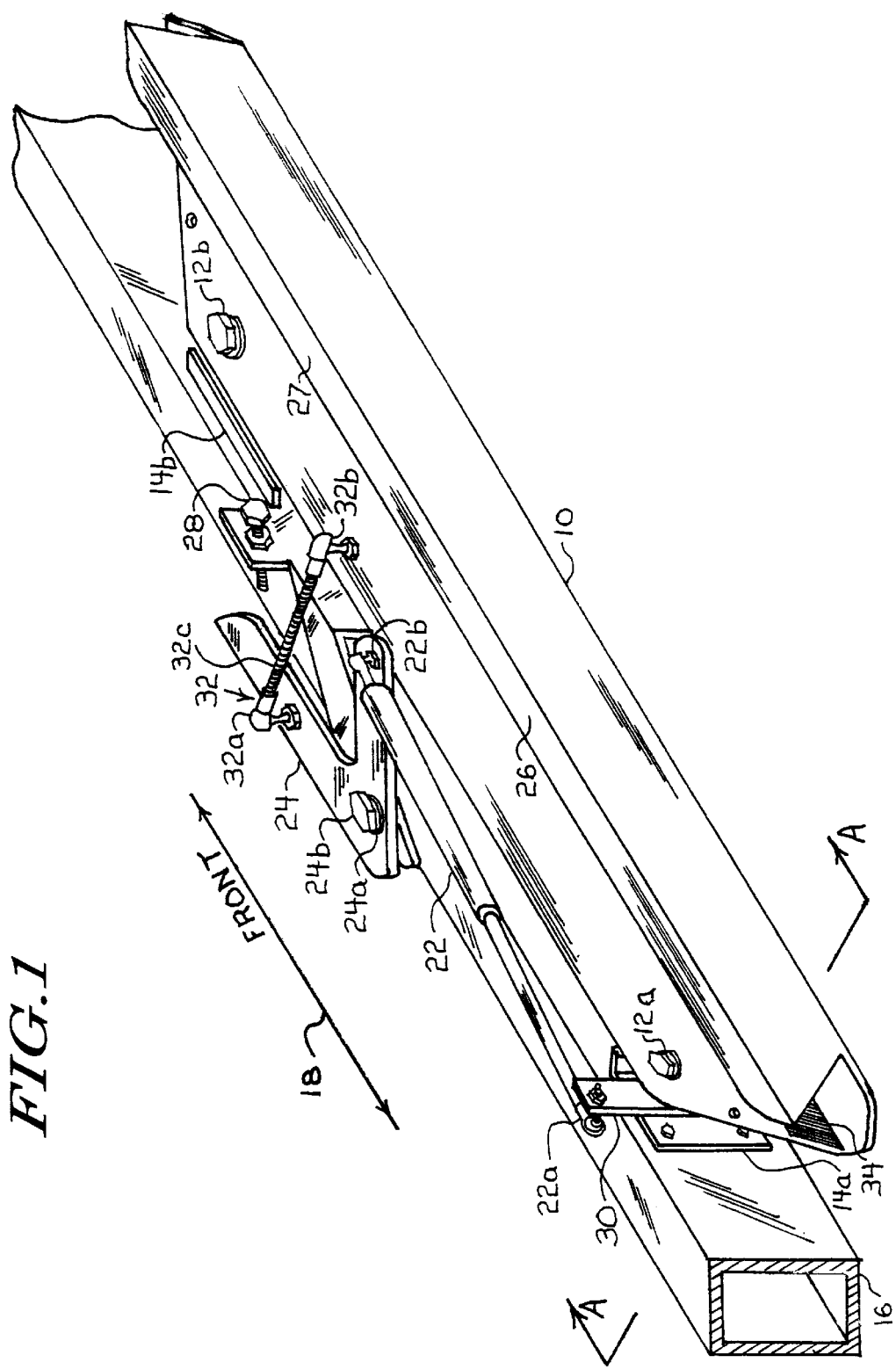
FIG. 1—Device in protective or raised position

10 Protective Barrier
12a Rotating Link
12b Rotating Link
14a Mounting bracket
14b Mounting bracket
16 Vehicle frame
18 Vehicle fore-aft axis
22 Gas spring
22a Rod end
22b Rod end
24 Pivot link
24a Bushing
24b Pivot bolt
26 Non-slip substance
27 Step Support Surface
28 Stop bolt
30 Adjustment tab
32 Connecting link
32a Rod end
32b Rod end
32c Threaded rod
34 Damping material
36 Forward downstop
38 Back downstop

SUMMARY OF INVENTION

A potective barrier for mounting in close proximity to a vehicle's protected areas, specifically a vehicle's underbody and lower outer body surfaces that repositions an integral step support surface (suitable for supporting an occupant's foot during entry/exit from the vehicle) to a lower position relative to its starting position thereby easing the person's act of vehicle entry or exit.

The mounting design is such that there are no invasive operations performed to the vehicle's chassis or body surfaces, ensuring the enforcement of any vehicle warranty provided by the manufacturer that may be in effect.

DESCRIPTION OF THE PREFERRED EMBODIMENT OF THE INVENTION

Figure 2:
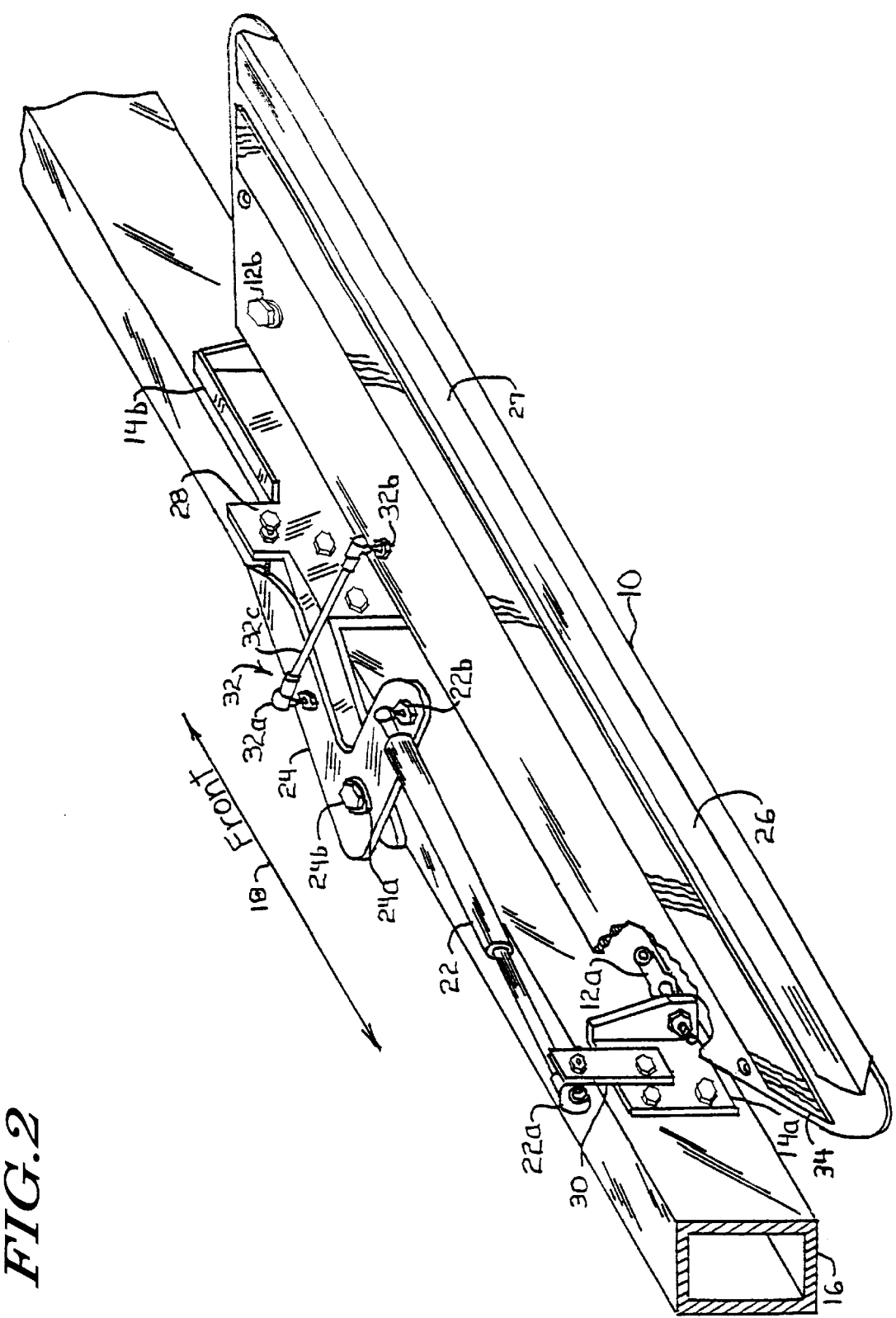
FIG. 2—Device in step or lowered position
Figure 3:
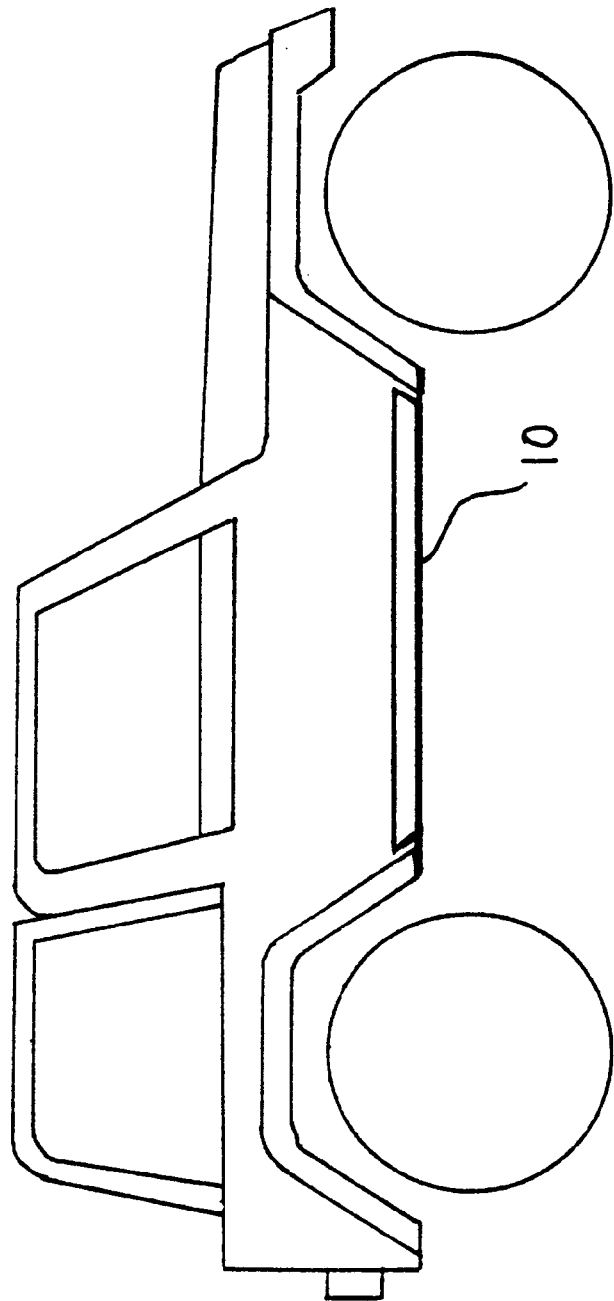
FIG. 3—Side view showing continuous design line, and pleasing aesthetic addition to the vehicle FIG. 4 Section showing device in raised position, and phantomed in lowered position

The preferred embodiment of the Maximum Clearance High Strength Vehicle Lower Body Protector That Repositions to a Vehicle Entry/Exit Step is illustrated in perspective by FIGS. 1 and 2, in elevation in FIG. 3 and cross-sectionally in Sec. A—A. FIG. 1 shows the raised or protective position. FIG. 2 shows the lowered or step position. Sec. A—A shows the raised or protective position in solid line, and the lowered or step position in phantom.

A Protective Barrier 10 is supported by Rotating Links 12a and 12b, which connect to Mounting Brackets 14a and 14b respectively. Mounting Brackets 14a and 14b then connect to the vehicle's main supporting member or Vehicle Frame 16 using existing mounting holes if the vehicle is a Jeep Model TJ Wrangler from model year 1997 or newer. Rotating Links 12a and 12b restrain vertical and horizontal movement but allow axial rotation. Rotational motive power for Protective Barrier 10 around the lower end of Rotating Links 12a and 12b is provided by the extension action of a Gas Spring 22 and its mechanical connection to Protective Barrier 10 via a Pivot Link 24 and a Connection Rod 32.

Protective Barrier 10 is constructed of sheet steel of necessary strength to protect the covered vehicle body areas from damage during off-road usage such as when coming into contact with rocks. This will typically require sheet steel ³⁄₁₆" to ¼" thick. Protective Barrier 10 is placed generally in a horizontal plane, with its longer dimension running parallel with a Vehicle Fore-Aft Axis 18. The fore-aft dimension is of a sufficient length to provide coverage along the entire fore-aft dimension of the vehicle lower outer edge (commonly referred to as the vehicle rocker panel).

The width of Protective Barrier 10 is defined as the horizontal dimension perpendicular to the Vehicle Fore-Aft Axis 18. This width extends from the inboard edge of Protective Barrier 10 near Vehicle Frame 16 outward toward the vehicle lower outer edge, and continues slightly (approx. 2 or 3 inches) outboard of the vehicle lower outer edge. Protective Barrier 10 is positioned so the top surface of this section of its width as just described is in near proximity but slightly below the vehicle's underbody and the vehicle lower outer edge. It may be formed to roughly follow the contours of the vehicle underbody.

At the point slightly outboard of the vehicle lower outer edge, Protective Barrier 10 is formed by bending so its length continues vertically upward for a short length (approx. 3 inches).

At this point approx. 3" above vehicle lower outer edge Protective Barrier 10 is then formed again so that it turns inward, and extends back toward and to a point near the vehicle body. The top surface 27 of this inward running length is angled downward sufficiently from the horizontal as it nears the vehicle body so that when Protective Barrier 10 is in the lowered, or step position, (FIG. 2) this top surface 27 as just described is level or parallel to the ground when the vehicle is resting on level ground. This top surface 27 is covered with a Non-Slip Substance 26 such as a paint mixed with ground bits of rubber or non-slip adhesive tape.

The resulting cross sectional shape of Protective Barrier 10 as described is similar to a capital letter J rotated 90° clockwise, as shown in Sec. A—A.

There are two Rotating Links 12a and 12b acting to support and allow rotation of Protective Barrier 10. The top of each Rotating link 12a and 12b is bolted securely to Protective Barrier 10. The lower end of each Rotating link 12a and 12b is bolted in turn to Mounting Brackets 14a and 14b respectively. Brackets 14a and 14b are bolted to the vehicle's frame or support member. Mounting bracket 14b has a portion of its aft section formed at 90° and contains a hole to accept a Pivot Bolt 24b as will be subsequently described.

Rotating Links 12a and 12b, as we as Rod Ends 22a, 22b, 32a and 32b consist of what is known in the industry as a Rod End or Heim Joint with one end having female threads and the other end having a 90° male threaded stud. The design and construction of such a Rod End provides restraint in radial and axial directions while allowing rotational movement about the axial direction.

Rotating link 12a is positioned near and designed to support the aft portion of Protective Barrier 10. Rotating link 12b is positioned near and designed to support the forward portion of Protective Barrier 10.

Protective Barrier 10 is caused to move from the lowered, or step position as shown in FIG. 2 to the protective, or raised position as shown in FIG. 1 by means of a Gas Spring 22. The aft end of Gas Spring 22 is connected to an Adjustment Tab 30 via a Rod End 22a. Adjustment Tab 30 is bolted to Mounting Bracket 14a. The forward end of Gas Spring 22 is connected to the aft end of a Pivot Link 24 via a Rod End 22b. The hole in Pivot Link 24 that Rod End 22b passes through is slotted so as to provide for varying lever arm distance from the center of the pivoting action.

Pivot Link 24 is mounted to Mounting Bracket 14b through a Bushing 24a and a Pivot Bolt 24b. Pivot Bolt 24b passes through the hole previously described in Mounting Bracket 14b. Pivot Link 24 pivots about Pivot Bolt 24b and bears on Bushing 24a.

The forward end of Pivot Link 24 is connected to a Connecting Link 32, which is comprised of Rod Ends 32a and 32b, and a Threaded Rod 32c. Threaded Rod 32c screws into the female threaded end of Rod End 32a and Rod End 32b. The assemblage of Threaded Rod 32c, Rod End 32a and Rod End 32b comprises what is defined as Connecting Link 32. The inboard end of Connecting Link 32 connects to the forward end of Pivot Link 24 by means of the 90° male-studded end of Rod End 32a. The hole in Pivot Link 24 that Rod End 32a passes through is slotted so as to provide for varying lever arm distance from the center of the pivoting action.

The outboard end of Connecting Link 32 connects to Protective Barrier 10 by means of the 90° male-studded end of Rod End 32b.

A thin strip of a Damping Material 34 is glued to Protective Barrier 10 in the contact area between Protective Barrier 10 and the vehicle underbody.

A Stop Bolt 28 is fastened to Mounting Bracket 14b to provide a stopping action on the movement of Pivot Link 24.

The Forward Downstop 36 is connected on the lower end to the Protective Barrier 10, and on the upper end to the vehicle body. For clarity, Forward Downstop 36 is not shown in FIGS. 1–3, and is referred to in Sec. A—A.

The Back Downstop 38 is connected on the lower end to the Protective Barrier 10, and on the upper end to the vehicle body. For clarity, Back Downstop 38 is shown in Sec. A—A but not FIGS. 1–3.

OPERATION OF THE PREFERRED EMBODIMENT OF THE INVENTION

The areas of operation of the Maximum Clearance High Strength Vehicle Lower Body Protector That Repositions to a Vehicle Entry/Exit Step include:

- protection of the vehicle's lower body sections
- provision of a lowered step surface for use by vehicle occupants.

Protection of the vehicle's lower body sections is accomplished by Protective Barrier 10 coverage of the under body area of the vehicle. The area of coverage is bounded on the inner edge by Vehicle Frame 16, on the outer edge by the vehicle lower outer edge, on the forward edge by the forward extent of the vehicle lower outer edge, and on the aft edge by the aft extent of the ehicle lower outer edge. The forward and aft boundaries include the length of the vehicle lower outer edge that may be concealed from the casual view by vehicle fender flares or wheel-well coverings.

Provision of a lowered step surface 27 for vehicle occupants is accomplished by the rotation of Protective Barrier 10 about the pivot line formed by connecting the center point of the male stud ends of Rotating Links 12a and 12b. This rotation is typically initiated by the vehicle occupant placing their foot on the section of Protective Barrier 10 that is coated with Non-Slip Substance 26. The downward force exerted by the occupant upon Protective Barrier 10 causes a rotational force to be transmitted through the assembly of Protective Barrier 10 and Rotating Links 12a and 12b. This rotational force is transmitted from Protective Barrier 10 through Connecting Link 32 and Pivot Link 24, and causes compression of Gas Spring 22.

This downward rotation of Protective Barrier 10 will ultimately be stopped when Pivot Link 24 comes into contact with Stop Bolt 28, or otherwise when Forward Downstop 36 and Back Downstop 38 reach their maximum extended length. Stop Bolt 28 is adjusted to make contact with the forward-most edge of Pivot Link 24 to limit rotational motion of Pivot Link 24, thereby limiting rotational motion of Protective Barrier 10. The limiting action of Stop Bolt 28 protects against over-compression of Gas Spring 22.

The occupant will typically remove the motive force provided by their foot pressing on Protective Barrier 10 once they have completely entered or exited the vehicle. The force from Gas Spring 22 is always present however, so with the removal of the downward force provided by the occupant, the force provided by Gas Spring 22 and delivered to Protective Barrier 10 via Pivot Link 24 and Connecting Link 32 will cause opposite rotational motion of the device and raise Protective Barrier 10 until Damping Material 34 contacts the underbody surface of the vehicle.

Protective Barrier 10 is pressed against the vehicle's underbody surface with sufficient force provided by Gas Spring 22 so as to not be dislodged from that surface under normal driving conditions on smooth or slightly irregular surfaces. The force provided by Gas Spring 22 is controlled by movement of Adjustment Tab 30 until Gas Spring 22 experiences compression sufficient to provide that force.

DESCRIPTION AND OPERATION OF OTHER EMBODIMENTS OF THE INVENTION

Other embodiments of my invention include

- the mounting bracket encircles the vehicle main chassis member instead of attaching to holes in the main chassis member
- the pivot point may be provided by a pivot bolt (a threaded bolt whose head is donut shaped, the hole of which accepts another bolt to connect additional mechanisms to)
- the Rotating Links 12a and 12b (rod ends) can be without the male stud end, with a bolt replacing the connection means
- the motive force to reposition the protective barrier provided by an electric motor or hydraulic pump with appropriately designed linkages, wiring and piping and operated via an appropriately positioned sensor or switch that activates the motive force, such as a sensor in the proximity of the vehicle door that initiates activation of the motive force by sensing movement of the door
- a Protective Barrier 10 constructed of structural shapes such as tubing, flat bar, angle iron, etc. instead of a plate
- a Step Support Surface 27 with a different cross sectional shape such as oval or circular
- a Protective Barrier 10 that is not solid but has material removed from it for purposes such as decorative, weight considerations or access
- a material other than steel used for construction such as aluminum, high strength plastic or composite material
- a Step Support Surface 27 that is attached to a Protective Barrier 10 instead of being integral with it
- additional attachments to the device, such as lights or reflective material geometry designed into the device for use as storage chambers a Non-slip Substance 26 made of a variety of materials such as adhesive backed non-slip tape, an attached length of expanded metal or a coating with embedded non-slip particles.

CONCLUSION, RAMIFICATION AND SCOPE OF INVENTION

The reader can deduce from the material herein presented that the invention provides protection to the most vulnerable body surfaces of the vehicle to which it's attached. This protection is from collisions occurring beneath the vehicle and from the side of the vehicle, and may occur in the horizontal or vertical directions as well as the included angles between.

Additionally, the user of my invention will experience a greatly eased entry or exit from the vehicle as he or she uses the step support surface in its repositioned state.

The preferred embodiment of the Maximum Clearance High Strength Vehicle Lower Body Protector That Repositions to a Vehicle Entry/Exit Step as described:

avoids common and costly body repair bills to the areas protected provides body protection for use of the vehicle it's attached to provides for protection along the entire length of the vehicle rocker panel area protects the underbody area of the vehicle to the point of the main frame member is designed to match the visual lines and design of the vehicle provides for a lower step in/out height for vehicle occupants mounts to a vehicle with no drilling, welding or other invasive operations can be installed and maintained with typical tools involves the loss of less than 1" of ground clearance provides a support point for lifting the side of the vehicle avoids drilling in the vehicle body avoids metal to metal rubbing against the vehicle's body which may result in removal of paint and subsequent rusting of base vehicle metal Although the description above contains many specifics, these should not be construed as limiting the scope of the invention but as merely providing advantages of some of the presently preferred embodiments of my invention. For example the step support surface can have other cross sectional shapes such as circular or oval, these can be shapes removed from the plate for decorative or access purposes, the protective barrier can by made from structural shapes instead of a plate, the material used can be other than steel, such as aluminum or high strength plastic or compound materials, the step support surface can be attached to the protective barrier instead of being integral with it, there can by other attachments as well, such as lights or reflective material, the geometry can by such that sealed cavities can by used as compressed air storage chambers or removeably sealed cavities can be created within the geometry and design for use as storage compartments, the non-slip surface can be provided by other means such as an attached length of expanded metal or applied paint containing included grit particles.

Accordingly, the scope of the invention should be determined not by the embodiment(s) illustrated or described, but by the appended claims and their legal equivalents.

What is claimed is:

1. A protective barrier for connecting to a vehicle that additionally provides a repositionable surface for entry or exit from said vehicle, comprising:

a) a barrier shaped so as primarily to protect the partial under and outer side of said vehicle and b) a step support surface integral with said barrier suitable for use during occupant entry or exit from said vehicle and c) a connective means between said vehicle and said barrier that positions said barrier in close proximity to said vehicle's protected surfaces and also allows repositioning of said integral step support surface for use during entry or exit from said vehicle and d) a means of restoring said barrier to said close proximity position following an occupant's use of said integral step support surface for entry or exit from said vehicle whereby said vehicle's surfaces are protected from damage due to collision or contact with or by other objects and said repositioning of said step support surface enhances entry or exit from said vehicle.

* * * * *